US008116974B2

(12) United States Patent
Cummings

(10) Patent No.: US 8,116,974 B2
(45) Date of Patent: Feb. 14, 2012

(54) CONDUCTING LOCALIZED SEARCHES IN A WIRELESS CLIENT-SERVER NAVIGATION SYSTEM

(76) Inventor: Ian Cummings, Ypsilanti, MI (US)

( * ) Notice: Subject to any disclaimer, the term of this patent is extended or adjusted under 35 U.S.C. 154(b) by 810 days.

(21) Appl. No.: 12/114,149

(22) Filed: May 2, 2008

(65) Prior Publication Data

US 2008/0275638 A1 Nov. 6, 2008

Related U.S. Application Data

(60) Provisional application No. 60/917,773, filed on May 14, 2007, provisional application No. 60/915,530, filed on May 2, 2007.

(51) Int. Cl.
*G01C 21/00* (2006.01)
(52) U.S. Cl. ........ 701/201; 701/202; 701/208; 701/209; 701/210; 701/211; 340/990; 340/995.19
(58) Field of Classification Search .................. 701/201, 701/207, 208, 209, 210, 211
See application file for complete search history.

(56) References Cited

U.S. PATENT DOCUMENTS

| 6,070,122 | A | 5/2000 | Ishida et al. | |
|---|---|---|---|---|
| 6,107,944 | A | 8/2000 | Behr et al. | |
| 6,347,278 | B2 | 2/2002 | Ito | |
| 7,219,159 | B2 * | 5/2007 | Mouri et al. | 709/241 |
| 2001/0056325 | A1 * | 12/2001 | Pu et al. | 701/202 |
| 2002/0049535 | A1 * | 4/2002 | Rigo et al. | 701/211 |
| 2002/0077746 | A1 * | 6/2002 | Zuber et al. | 701/209 |
| 2004/0030493 | A1 * | 2/2004 | Pechatnikov et al. | 701/208 |
| 2004/0260465 | A1 * | 12/2004 | Tu | 701/209 |
| 2004/0260466 | A1 * | 12/2004 | Ichihara et al. | 701/209 |
| 2005/0033511 | A1 * | 2/2005 | Pechatnikov et al. | 701/210 |
| 2005/0251334 | A1 * | 11/2005 | Mizuno | 701/209 |
| 2006/0271283 | A1 * | 11/2006 | Fraser et al. | 701/209 |
| 2007/0005242 | A1 * | 1/2007 | Kato et al. | 701/211 |
| 2007/0208498 | A1 * | 9/2007 | Barker et al. | 701/117 |
| 2008/0010011 | A1 * | 1/2008 | Glaza | 701/209 |
| 2008/0140309 | A1 * | 6/2008 | Jendbro | 701/202 |
| 2008/0262717 | A1 * | 10/2008 | Ettinger | 701/206 |
| 2009/0048774 | A1 * | 2/2009 | Yoshioka et al. | 701/202 |
| 2010/0312466 | A1 * | 12/2010 | Katzer et al. | 701/201 |

* cited by examiner

*Primary Examiner* — Khoi Tran
*Assistant Examiner* — Jonathan L Sample
(74) *Attorney, Agent, or Firm* — Gifford, Krass, Sprinkle, Anderson & Citkowski, P.C.

(57) ABSTRACT

A system and method are disclosed for conducting searches and generating routes to selected points of interest using a wireless client-server (WCS) navigator. A method includes the step of requesting, at a mobile unit, information about one or more locations meeting certain criteria. Locations meeting the criteria are displayed on the display screen at the location of the user and, if a location is selected, a route to include the selected location is automatically generated. Guidance regarding how to travel to the selected location may also be provided. If the user is already en route to a destination when a route to a selected location is requested, the navigator may generate a route that includes both the original destination and the selected new location. If the user is already en route to a destination when locations matching criteria are requested, along with the locations displayed the navigator may provide information to the user as to the total travel time or distance of a route passing through the original destination and a new location or the additional travel time or distance in comparison to the original route. The method may further include the step of requesting information about a class of locations such as restaurants.

1 Claim, 2 Drawing Sheets

CONDUCTING LOCALIZED SEARCHES IN A WIRELESS CLIENT-SERVER NAVIGATION SYSTEM

REFERENCE TO RELATED APPLICATION

This application claims priority from U.S. Provisional Patent Application Ser. Nos. 60/915,530, filed May 2, 2007 and 60/917,773, filed May 14, 2007, the entire content of both applications is incorporated herein by reference.

FIELD OF THE INVENTION

This invention relates generally to wireless, client-server (WCS) vehicle navigation systems and, in particular, to a system and method for conducting searches and generating routes to selected points of interest using a WCS navigator.

BACKGROUND OF THE INVENTION

In a wireless client-server (WCS) navigator, route searches and map generation are performed at a central location and transmitted to mobile units. The central server manages databases of geographical information and, in response to requests from the mobile clients, guidance is downloaded in the form of maps, routes, and/or instructions.

The engineering and business requirements of WCS navigation differ somewhat from those of standard standalone navigators. One major difference is that for WCS navigators, data transmission costs are a large part of the ongoing cost of operating the system. In order to economically provide WCS navigation, it is important to minimize the amount of data transmitted while still meeting customers' navigation needs.

SUMMARY OF THE INVENTION

This invention resides in a system and method for conducting searches and generating routes to selected points of interest using a wireless client-server (WCS) navigator. In a WCS navigator of the type wherein an original route and map generation are performed at a central location and transmitted to a mobile unit having a display screen, a method according to the invention includes the step of requesting, at the mobile unit, information about one or more locations meeting certain criteria. Locations meeting the criteria are displayed on the display screen and, if a location is selected, a route to include the selected location is automatically generated. Guidance regarding how to travel to the selected location may also be provided.

If the user is already en route to a destination when a route to a selected location is requested, the navigator may generate a route that includes both the original destination and the selected new location. If the user is already en route to a destination when locations matching criteria are requested, along with the locations displayed the navigator may provide information to the user as to the total travel time or distance of a route passing through the original destination and a new location or the additional travel time or distance in comparison to the original route. The method may further include the step of requesting information about a class of locations such as restaurants.

According to the invention, a method of providing guidance in a wireless client-server navigation system to a location matching criteria input by a user, comprises the steps of: receiving, at a mobile client, data representative of criteria for locations;

transmitting the mobile client data representative of criteria for locations from the mobile client to a central server;

searching a database at the central server for locations matching the criteria;

transmitting data representative of found locations and data associated with found locations matching the criteria from the central server to the mobile client;

transmitting data representative of maps of a vicinity proximate to the found locations from the central server to the mobile client;

presenting, at the mobile client, representations of the found locations and associated data;

receiving, at the mobile client, data representative of a selection of one of the found locations; and providing guidance with the mobile client in the form of a moving map display upon which there is displayed representations of a map, the location of the mobile client updated on a real-time basis, the location of the selected location, and guidance for traveling from the mobile client's location to the selected location.

The data associated with the found locations may include contact information associated with the location, such as phone number, cell phone number, email address, home or business address, etc.

A wireless client-server navigation system according to the invention comprises a mobile unit and a central server. The mobile unit includes a wireless transmitter for transmitting data representative of criteria for selection of a location and a request for data representative of a location. The mobile unit further includes a receiver for receiving the data representative of the location and associated data, and a display for displaying locations on a moving map display in real-time fashion.

The central server includes an input for receiving data describing map-related features in the form of line segments interconnecting points having coordinates, a receiver for receiving the data and request from the mobile unit, a processor for searching a database of locations according to said criteria, and a transmitter for transmitting data representative of locations matching said criteria and associated data to the mobile unit. The data associated with the found locations includes contact information associated with the location.

DETAILED DESCRIPTION OF THE INVENTION

This invention resides in a system and method for conducting searches and generating routes to selected points of interest using a wireless client-server (WCS) navigator. According to a method aspect, a user first commands the navigator to find a category of locations, such as, for example "nearby fast food restaurants." The navigator finds such locations and displays the position of these locations on a map display. The user then indicates to the navigator the location(s) to which he would like to travel. The navigator then, without further input by the user, automatically updates the route to include the selected location(s), and provides guidance to the user as to how to travel to the selected location(s). Information may also be provided to aid in contacting a location.

If the user is already en route to a destination when a route to a selected location is requested, the navigator may generate a route that includes both the original destination and the selected new location.

If the user is already en route to a destination when locations matching criteria are requested, along with the locations displayed the navigator may provide information to the user as to the total travel time or distance of a route passing through the original destination and a new location or the additional travel time or distance in comparison to the original route.

Figure 1:
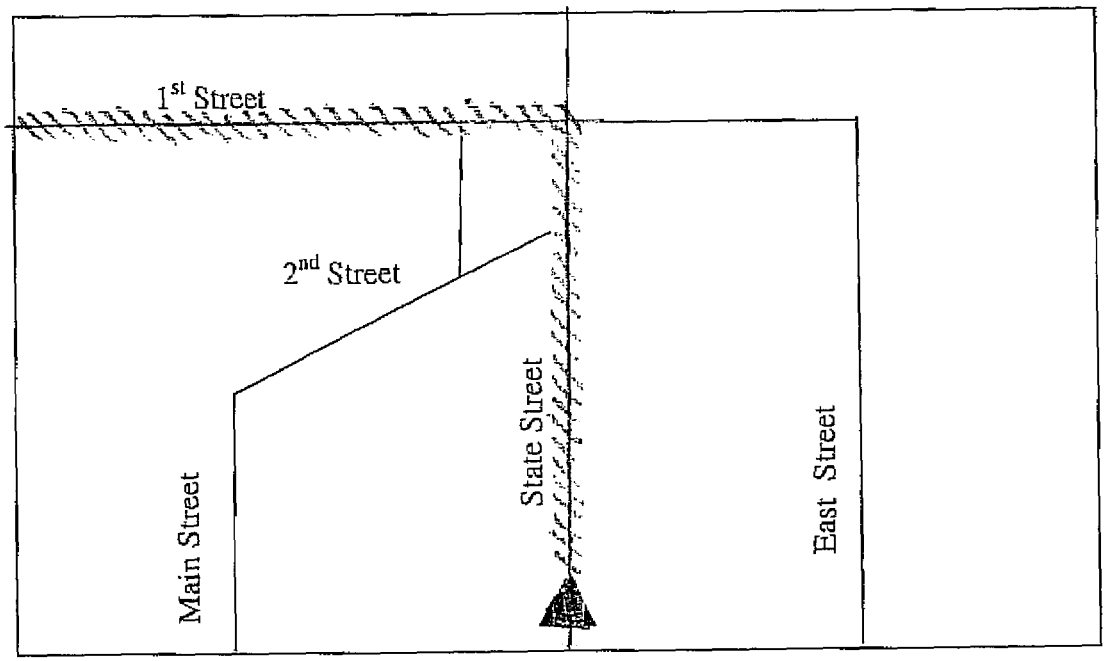
FIG. 1 is a moving map display, showing the navigator's current position with a triangle and a planned route in highlighted form.
Figure 2:
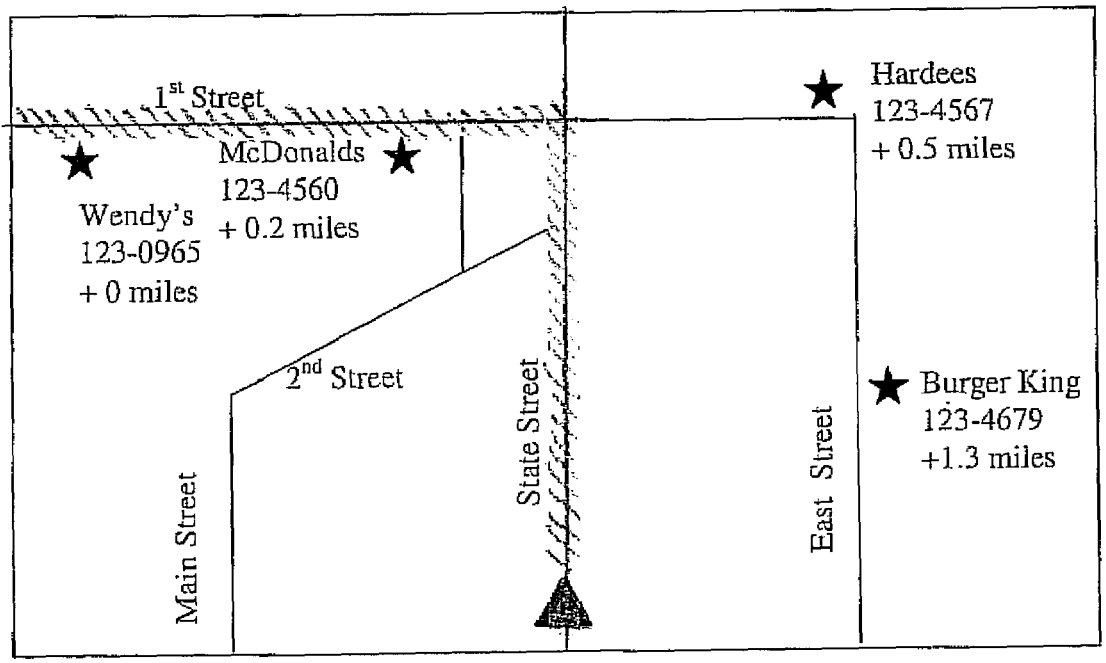
FIG. 2 shows how the user has requested the locations of nearby fast food restaurants.
Figure 3:
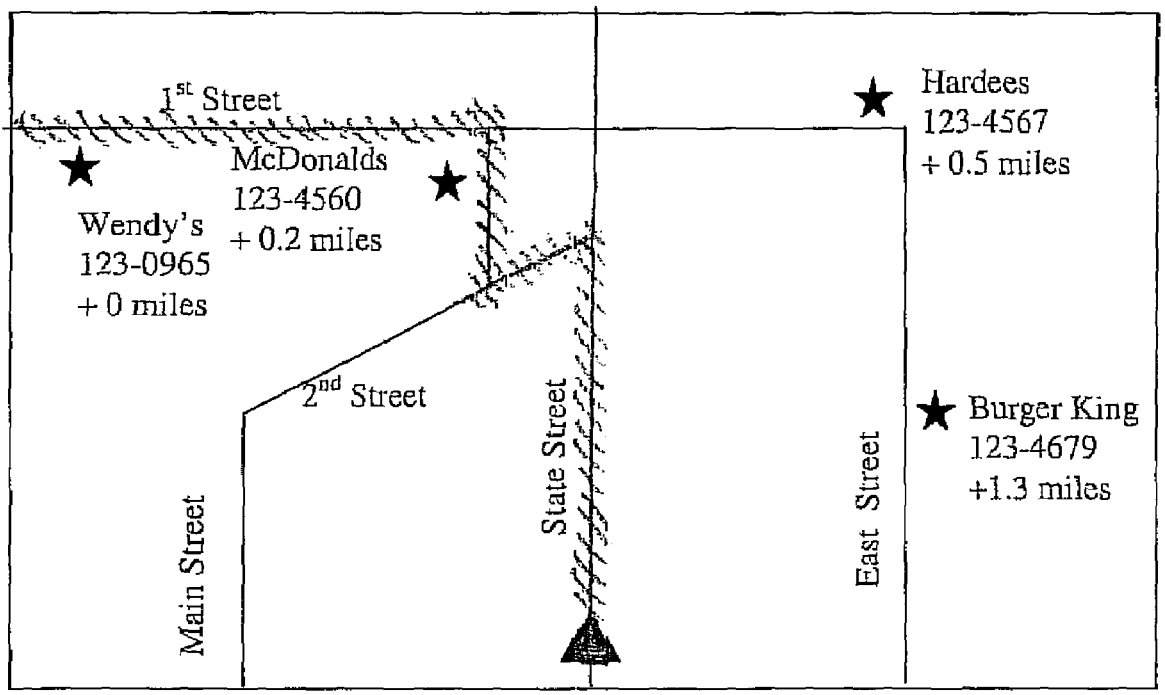
FIG. 3 shows how the user has selected McDonald's, and a route is provided that includes both the original and the new destination.

FIG. 1 is a moving map display, showing the navigator's current position with a triangle and a planned route in highlighted form. In FIG. 2, the user has requested the locations of nearby fast food restaurants. In FIG. 3, the user has selected McDonald's, and a route is provided that includes both the original and the new destination.

I claim:

1. A method of providing guidance with a wireless client-server navigation system to a location matching criteria, comprising the steps of:

following an original route to a destination;

receiving, at a mobile client, data representative of criteria for locations;

transmitting the data representative of the criteria for locations from the mobile client to a central server;

searching a database of locations at the central server for locations matching the criteria;

generating new routes, each of which includes a found location and the destination of the original route;

transmitting data representative of, and associated with, found locations matching the criteria from the central server to the mobile client;

presenting, at the mobile client, representations of the found locations and associated data;

presenting, at the mobile client, representations of additional distance or travel time of the new routes, or incremental distance or travel time of the new routes as compared to the original route;

receiving, at the mobile client, data representative of a selection of one of the found locations; and providing guidance with the mobile client from the mobile client's location to the selected location.

* * * * *